(12) United States Patent
Pallini, Jr. et al.

(10) Patent No.: US 6,478,344 B2
(45) Date of Patent: Nov. 12, 2002

(54) THREADED CONNECTOR

(75) Inventors: Joseph P. Pallini, Jr., Tomball, TX (US); Rockford D. Lyle, Pinehurst, TX (US); Brian N. Munk, Houston, TX (US)

(73) Assignee: ABB Vetco Gray Inc., Houston, TX (US)

( * ) Notice: Subject to any disclaimer, the term of this patent is extended or adjusted under 35 U.S.C. 154(b) by 0 days.

(21) Appl. No.: 09/906,204

(22) Filed: Jul. 16, 2001

(65) Prior Publication Data

US 2002/0033603 A1 Mar. 21, 2002

Related U.S. Application Data

(60) Provisional application No. 60/232,898, filed on Sep. 15, 2000.

(51) Int. Cl.[7] .................. F16L 25/00; F16L 35/00
(52) U.S. Cl. ............... 285/333; 285/334; 285/355; 285/390
(58) Field of Search .................. 285/334, 333, 285/355, 390

(56) References Cited

U.S. PATENT DOCUMENTS

| | | | |
|---|---|---|---|
| 3,856,337 A | | 12/1974 | Ehm et al. |
| 3,870,351 A | | 3/1975 | Matsuki |
| 4,601,491 A | * | 7/1986 | Bell et al. .............. 285/334 |
| 4,624,488 A | | 11/1986 | Furgeson |
| 4,707,001 A | | 11/1987 | Johnson |
| 5,137,310 A | * | 8/1992 | Noel et al. ............. 285/333 |
| 5,505,502 A | * | 4/1996 | Smith et al. ............ 285/334 |
| 5,649,725 A | * | 7/1997 | Nagasaku et al. ....... 285/334 |
| 5,687,999 A | | 11/1997 | Lancry et al. |
| 6,010,163 A | | 1/2000 | Cerruti |
| 6,047,997 A | | 4/2000 | Olivier |

FOREIGN PATENT DOCUMENTS

| | | |
|---|---|---|
| EP | 0488912 A2 | 6/1992 |
| EP | 488912 A2 * | 6/1992 |
| GB | 1302104 | 1/1973 |
| GB | 2159904 A | 12/1985 |
| GB | 2195728 A | 4/1988 |
| GB | 2230311 A | 10/1990 |

* cited by examiner

*Primary Examiner*—Lynne H. Browne
*Assistant Examiner*—Aaron M Dunwoody
(74) *Attorney, Agent, or Firm*—Bracewell & Patterson, L.L.P.

(57) ABSTRACT

An offshore riser includes a plurality of tubular elements, each having a pin member on one end and a box member on the other end for connection with adjacent tubular elements. The pin member has an external thread which engages an internal thread on the box member of the adjacent tubular element. A dual angle torque shoulder locks the box end securely into place against the pin, preventing radial distention of the box end and maintaining bearing pressure between the external sealing surfaces. Also, stress relief grooves are located on the box member and on the pin member, to reduce the incidence of stress fractures, thereby improving the fatigue life of the connection.

17 Claims, 2 Drawing Sheets

THREADED CONNECTOR

CROSS-REFERENCE TO RELATED APPLICATIONS

This application claims the benefit of provisional application U.S. Ser. No. 60/232,898, filed on Sep. 15, 2000

TECHNICAL FIELD

This invention relates in general to a threaded connection between two tubular elements, each having a pin member on one end and a box member on the other end. In particular, this invention relates to a threaded connection for use with offshore riser pipe.

BACKGROUND OF THE INVENTION

In offshore production applications, a plurality of tubular riser elements are joined together in an end-to-end configuration and extend from a subsea well assembly to a surface platform. Advances in drilling technology have made it possible to drill at greater water depths, subjecting the production risers to extremely high pressures and bending loads. Metal-to-metal seals can provide an effective seal under these harsh conditions; however, contamination, pitting, or damage to the seal surfaces causes these seals to deteriorate rapidly. Thermoplastic seal elements can be used as secondary sealing elements; however, these components typically resist radial compression and therefore create internal forces which act to urge the box and pin elements apart. Bending loads due to currents and wave motion can cause the metal seals to cycle, creating fatigue. This in turn reduces the effectiveness of the metal-to-metal seals, contributing to the failure of the connection.

Attempts have been made to overcome these problems. For example, U.S. Pat. No. 4,707,001 discloses a connection featuring multi-start threads with a reverse angle load flank in conjunction with a torque shoulder seal to lock the pin and box against radial separation. While this design may be workable, the torque shoulder could create plastic deformation in the box or pin member if too much torque is applied to the connection. This design is also susceptible to stress fractures because the torque shoulder seal applies repetitive bending loads to the box and pin.

SUMMARY OF THE INVENTION

The connection of this invention features a box member with an internal thread an a pin member with a cooperative external thread. A first metal-to-metal seal located adjacent to the box shoulder forms the primary internal seal of the connection. A second metal-to-metal seal located near the box end forms the primary external seal of the connection. Guide surfaces located on the pin end and box end protect the metal sealing surfaces from damage during makeup.

A dual angle torque shoulder in combination with a large blend radius is located on the pin member for engaging a corresponding dual angle box end, locking the box end securely into place against the pin. This configuration is self-centering. The dual angle torque shoulder has inner and outer inclined surfaces that join each other with a large blend radius. The dual angle torque shoulder in combination with the large blend radius self-centers, prevents radial distention of the box end, and maintains bearing pressure between the external sealing surfaces. Because the torque shoulder has a dual angle configuration, the pin and box will not undergo plastic deformation as a result of excessive torque. The torque shoulder on the box end is generally torroidal, being convex in cross-section.

The connection also has stress relief grooves located on the box member and on the pin member. These stress relief grooves reduce the incidence of stress fractures, thereby improving the fatigue life of the connection.

DETAILED DESCRIPTION OF THE PREFERRED EMBODIMENT

Figure 1:
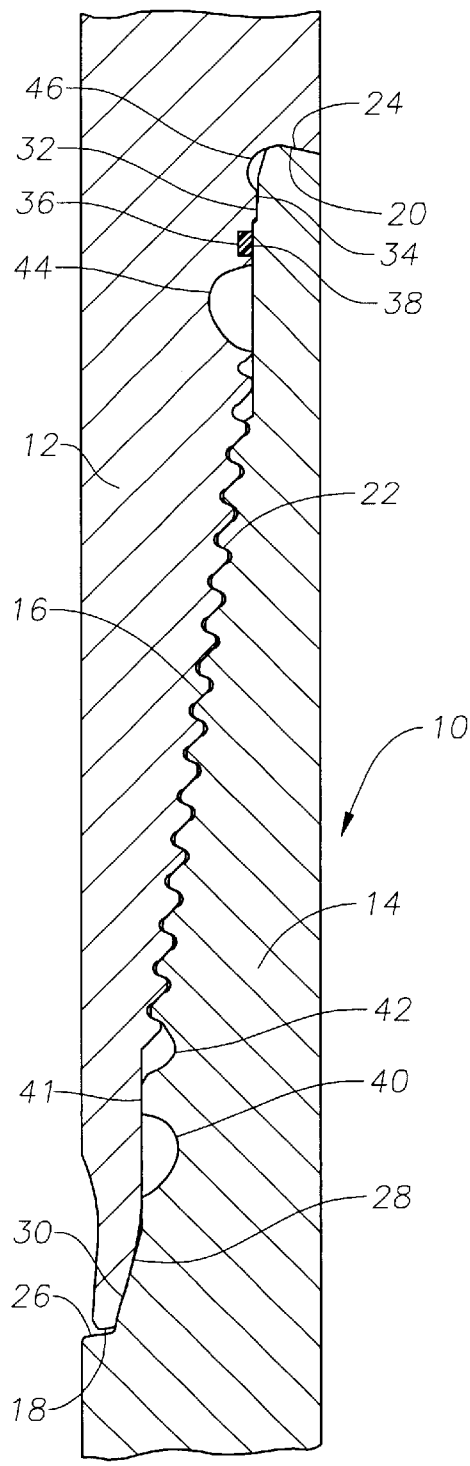
FIG. 1 is a cross-sectional view of a tubular connection according to the invention, showing the dual angle torque shoulder and the double stress relief grooves.

Referring to FIG. 1, the tubular connection or pipe joint 10 of a pin member 12 and box member 14 is shown. Pin 12 has an external thread 16 and extends from a pin end 18 to a dual angle torque shoulder 20. In a similar manner, box 14 has a cooperative internal thread 22 and extends from a box end 24 to a box shoulder 26. Threads 16 and 22 preferably have rounded roots.

Figure 2:
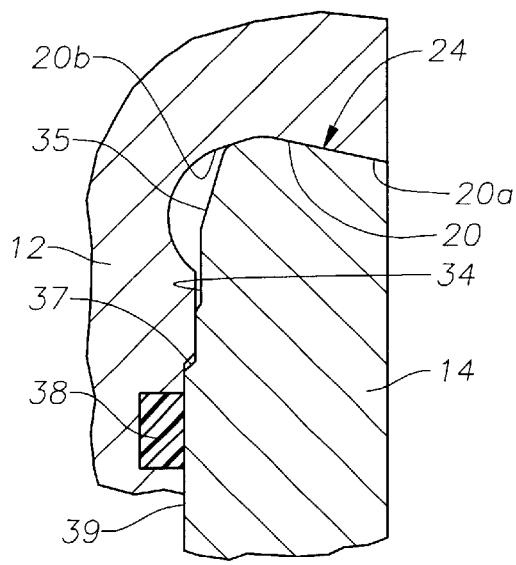
FIG. 2 is an enlarged cross-sectional view of the end of the box member of the connection of FIG. 1, showing the detail of the dual angle torque shoulder.

Referring to FIG. 2, dual angle torque shoulder 20 on pin member 12 is generally concave and comprises two conical surfaces: an outer surface 20a having a negative draft angle with respect to the outer surface of the tubular element, and an inner surface 20b extending inward from outer surface 20a and having a positive draft angle with respect to the outer surface of the tubular element. Outer surface 20a extends downward and outward from the intersection with inner surface 20b. Inner surface 20b extends downward and inward from its intersection with outer surface 20a. The angle of outer surface 20a relative to a plane perpendicular to the longitudinal axis of the connection 10 is approximately 30 degrees negative in the preferred embodiment. The angle of inner surface 20b relative to the same plane is approximately 5 degrees positive. These angles may differ, however. Outer surface 20a and inner surface 20b are formed so that the angle between surfaces 20a and 20b must be less than 180°, and in the preferred embodiment is approximately 150°. The width of outer surface 20a may be larger than inner surface 20b or vice-versa. A large blend radius of approximately 0.15 inch blends the junction of the two surfaces 20a and 20b. The outer and inner surfaces generally define an annular channel with a concave configuration.

Box end 24 comprises mating outer and inner conical surfaces, generally defining a convex configuration or a toroid, so that the box end 24 fits securely within the dual angle torque shoulder 20. This configuration locks the box end 24 securely into place against the pin 12, preventing radial distention of the box end 24.

Figure 3:
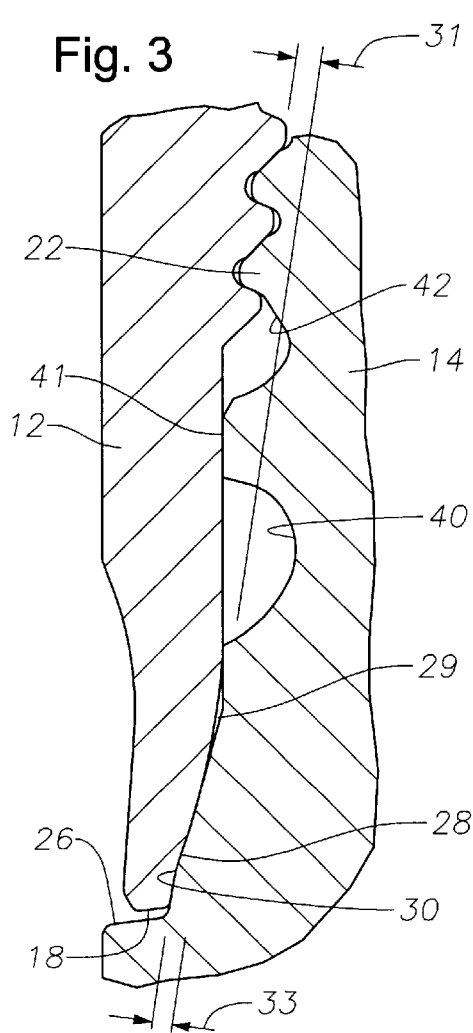
FIG. 3 is an enlarged cross-sectional view of the nose of the pin member and the base of the box member of the connection of FIG. 1.

The primary internal seal of the connection 10 is formed adjacent to the box shoulder 26 between an outwardly facing internal sealing surface 28 on pin 12 and an inwardly facing internal sealing surface 30 on box 14. This primary internal seal is an interference seal formed by the metal-to-metal contact between surfaces 28 and 30, as is well known in the art. Sealing surfaces 28 and 30 can be tapered. As shown in FIG. 3, metal seal surface 28 on the nose of pin 12 is recessed from a guide surface 29 located directly above. That is, the outer diameter of seal surface 28 is less than the outer diameter of guide surface 29.

The primary internal seal of the connection 10 is formed adjacent to the box shoulder 26 between an outwardly facing internal sealing surface 28 on pin 12 and an inwardly facing internal sealing surface 30 on box 14. This primary internal seal is an interference seal formed by the metal-to-metal contact between surfaces 28 and 30, as is well known in the art. Sealing surfaces 28 and 30 can be tapered. As shown in FIG. 3, metal seal surface 28 on the nose of pin 12 is recessed from a guide surface 29 located directly above. That is, the outer diameter of seal surface 28 is less than the outer diameter of guide surface 29. Guide surface 29 is conical and, relative to the longitudinal axis of box 14, is formed at an angle larger than the taper angle of internal thread 22, as indicated by the numeral 31 in FIG. 3. Also, a tangent line extending from guide surface 29 is located radially outward from pin nose sealing surface 28, as indicated by the numeral 33 in FIG. 3. If pin 12 is misaligned while stabbing into box 14, guide surface 29 will contact internal thread 22, protecting nose sealing surface 28.

The primary external seal of the connection 10 is formed near the box end 24 between an outwardly facing external sealing surface 32 on pin 12 and an inwardly facing external sealing surface 34 on box 14. This primary external seal is another interference seal, formed by the metal-to-metal contact between surfaces 32 and 34. Sealing surfaces 32 and 34 are located on a generally cylindrical portion of pin 12 and box 10, but can also be tapered. As shown in FIG. 2, a lead-in or guide portion 35 joining box sealing surface 34 is tapered. A seal ring groove 36 is formed on pin 12 between the external thread 16 and the outwardly facing external sealing surface 32. A thermoplastic seal ring 38 is located within seal ring groove 36. Seal ring 38 acts as a back-up seal to the metal-to-metal external seal. Seal ring 38 seals against a bore surface 39 in box 14 that is lower than and separated from metal sealing surface 34 by a shoulder or step 37. Alternately, seal ring 28 could be located above metal sealing surface 34. The inner diameter of box 14 is greater at metal sealing surface 34 than at bore surface 39.

Figure 4:
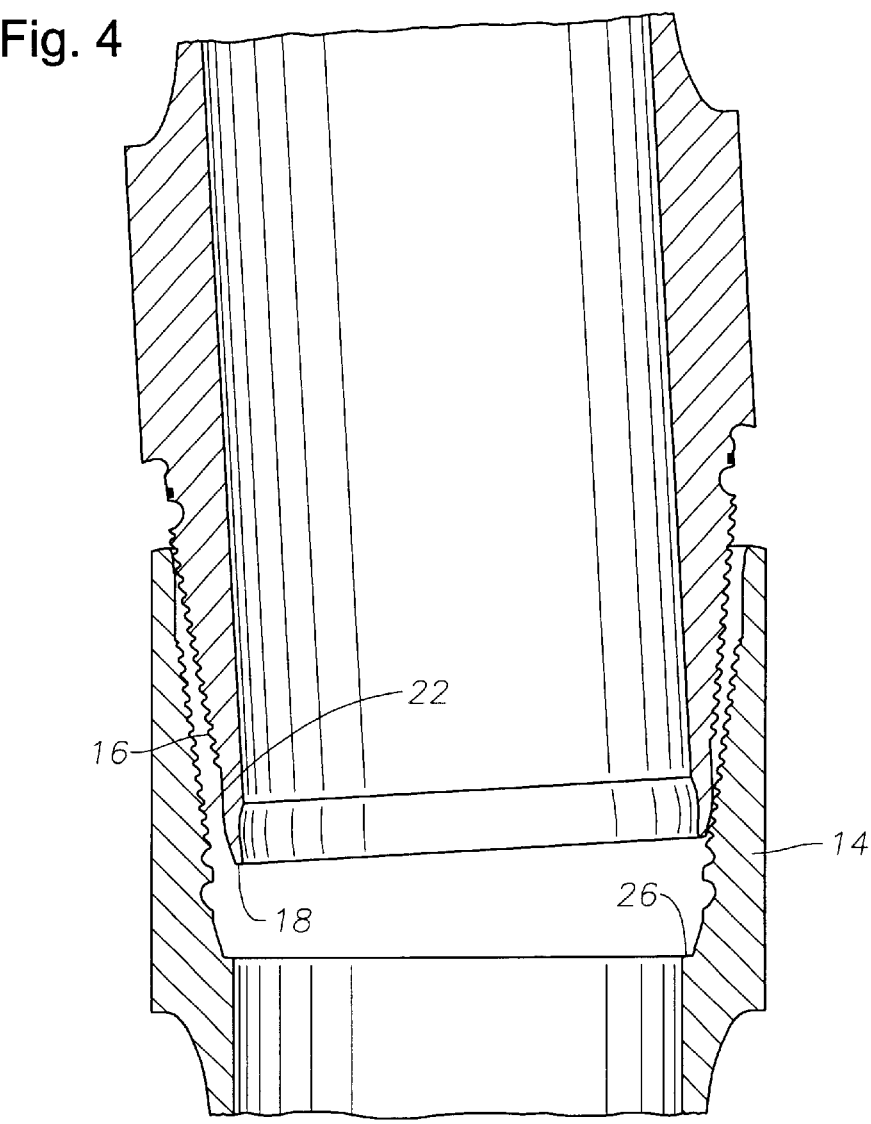
FIG. 4 is a cross-sectional view of the pin member of FIG. 1, shown stabbing into the box member of FIG. 1, and illustrating common misalignment that occurs during stabbing.
Figure 5:
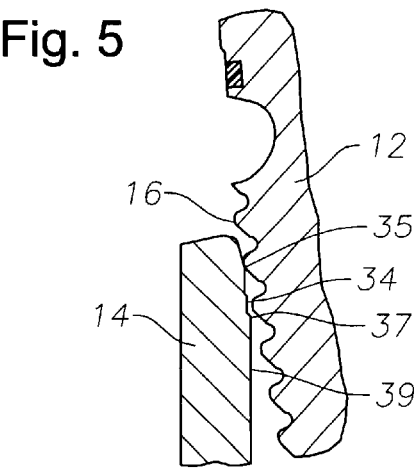
FIG. 5 is an enlarged cross-sectional view of an upper portion of the pin and box members shown in the position of FIG. 4.
Figure 6:
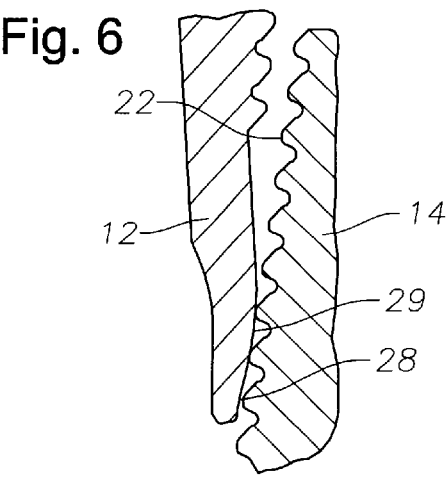
FIG. 6 is an enlarged cross-sectional view of a lower portion of the pin and box members shown in the position of FIG. 4.

Sealing surface 34 on box 10 is protected from damaging contact during stabbing, as indicated by the misaligned stabbing occurring in FIGS. 4–6. A portion of pin threads 16 may contact the tapered guide surface 35, but will not contact sealing surface 34 As shown in FIG. 5, the larger inner diameter of guide surface 35 as well as step 37 and smaller diameter bore portion 39 prevent contact. Similarly, pin nose sealing surface 28 is protected from damaging contact during stabbing, even if misaligned. As shown in FIG. 6, box threads 22 may contact guide surface 29, but not sealing surface 28 because of its smaller outer diameter.

Two stress relief grooves are formed on box 14. The lower box stress relief groove 40 is located adjacent to the inwardly facing internal sealing surface 30. The upper box stress relief groove 42 is located at the base of the threads 22, spaced axially a short distance from groove 40. These box stress relief grooves reduce the incidence of stress fractures of the box 14, thereby improving the fatigue life of the connection 10.

Two stress relief grooves are formed on box 14. The lower box stress relief groove 40 is located adjacent to the inwardly facing internal sealing surface 30. The upper box stress relief groove 42 is located at the base of the threads 22, spaced axially a short distance from groove 40. These box stress relief grooves reduce the incidence of stress fractures of the box 14, thereby improving the fatigue life of the connection 10. Stress relief grooves 44, 46 are separated by a conical band 41. Upper stress relief groove 42 has a lesser axial extent than lower stress relief groove 44, as well as a lesser radial depth. Sealing band 41 has a lesser axial width than lower stress relief groove 40.

Two stress relief grooves are also formed on pin 12. The lower pin stress relief groove 44 is located at the base of threads 16. The upper pin stress relief groove 46 is located adjacent to the dual angle torque shoulder 20. As is shown in FIG. 1, thermoplastic seal ring 38 is located generally between the pin stress relief grooves 44 and 46. The two pin stress relief grooves 44 and 46 reduce the incidence of stress fractures of the pin 12, thereby improving the fatigue life of the connection 10.

The invention has significant advantages. The metal seals are protected from damage due to misalignment while stabbing the pin into the box. The make-up of the connection is self-aligning up to a certain degree of misalignment, such as three degrees. The dual angle torques shoulders preload the connection to stabilize the metal seals from cyclic loading. The long torque nose reduces torque needed for preload.

While the invention has been shown or described in only one of its forms, it should be apparent to those skilled in the art that it is not so limited, but is susceptible to various changes without departing from the scope of the invention.

What is claimed is:

1. A tubular connection comprising:

a tubular pin member having external threads, a longitudinal pin axis, and a generally concave torque shoulder formed on an outer diameter of the pin member;

a tubular box member having internal threads and a generally convex mating surface formed on a rim of the box member that mates with the torque shoulder;

at least one metal sealing surface on the pin member and at least one metal sealing surface on the box member; wherein the at least one metal sealing surface on the pin member sealingly engages the at least one metal sealing surface on the box member;

a bore surface located in the box member;

an elastomeric seal ring located within an annular seal ring groove formed on the pin member, the elastomeric seal ring sealing against the bore surface; and wherein an inner diameter of box member is greater at the metal sealing surface than at the bore surface.

2. A tubular connection comprising:

a tubular pin member that has an external thread, a pin stress relief groove above the external thread, an upper metal sealing surface above the pin stress relief groove, and a torque shoulder above the upper metal sealing surface; and a tubular box member that has a cooperative internal thread, a torque surface that mates with the torque shoulder of the pin, a pair of box stress relief grooves below the internal thread, and a lower metal sealing surface below the box stress relief grooves.

3. A tubular connection comprising:
a tubular pin member that has an external thread, a pin stress relief groove above the external thread, an upper metal sealing surface above the pin stress relief groove, and a torque shoulder above the upper metal sealing surface; and
a tubular box member that has a cooperative internal thread, a torque surface that mates with the torque shoulder of the pin, a pair of box stress relief grooves below the internal thread, and a lower metal sealing surface-below the box stress relief grooves; and
another pin stress relief groove on the pin member above the upper metal sealing surface.

4. A tubular connection comprising:
a tubular pin member that has an external thread, a pin stress relief groove above the external thread, an upper metal sealing surface above the pin stress relief groove, and a torque shoulder above the upper metal sealing surface; and
a tubular box member that has a cooperative internal thread, a torque surface that mates with the torque shoulder of the pin, a pair of box stress relief grooves below the internal thread, and a lower metal sealing surface below the box stress relief grooves; and
an elastomeric seal ring located within an annular seal ring groove formed on the pin member adjacent the upper metal sealing surface.

5. The tubular connection of claim 3, wherein the torque shoulder on the pin generally defines a concave annular channel, and the torque surface on the box generally defines a toroid.

6. The tubular connection of claim 3, wherein:
the torque shoulder on the pin comprises a torque shoulder outer surface located adjacent to an outer diameter of the pin member that is at a first angle relative to a plane perpendicular to the pin axis, and a torque shoulder inner surface located inward from the torque shoulder outer surface of the pin member, the torque shoulder inner surface being at a second angle relative to a plane perpendicular to the pin axis; and
the torque surface on the box has outer and inner mating surfaces formed on a rim of the box member that mate with the torque shoulder outer and inner surfaces, respectively.

7. A tubular connection comprising:
a tubular pin member that has an external thread, the tubular pin member having a generally concave torque shoulder formed proximal the outer diameter of the pin member, the concave torque shoulder comprising an outer surface located adjacent to the outer diameter of the pin member and an adjoining inner surface;
a tubular box member that has a cooperative internal thread, the tubular box member having a generally convex mating surface formed on the open end of the box member, the mating surface comprising an outer surface located adjacent to the outer diameter of the box member and an adjoining inner surface;
a pin stress relief groove located on the outer surface of the pin member above the thread;
pair of box stress relief grooves located on the inner surface of the box member below the thread; and
at least one metal sealing surface on the pin member and at least one metal sealing surface on the box member, wherein the at least one metal sealing surface on the pin member sealingly engages the at least one metal sealing surface on the box member.

8. The tubular connection of claim 7, wherein the outer and inner surfaces of the concave shoulder generally comprise conical surfaces.

9. The tubular connection of claim 7 wherein:
the outer surface of the torque shoulder of the pin member has a negative draft angle with respect to the outer surface of the pin member;
the inner surface of the torque shoulder of the pin member has a positive draft angle with respect to the outer surface of the pin member;
the outer surface of the mating surface of the box member has a negative draft angle equal to the negative draft angle of the outer surface of the torque shoulder of the pin member; and
the inner surface of the mating surface of the box member has a positive draft angle equal to the positive draft angle of the inner surface of the torque shoulder of the pin member.

10. The tubular connection of claim 7, further comprising:
a bore surface located in the box member; and
an elastomeric seal ring located within an annular seal ring groove formed on the pin member, the elastomeric seal ring sealing against the bore surface.

11. The tubular connection of claim 10, wherein the bore surface is separated from the metal sealing surface by a shoulder.

12. The tubular connection of claim 10, wherein the inner diameter of box member is greater at the metal sealing surface than at the bore surface.

13. A tubular connection comprising:
a tubular pin member having a nose, external threads formed at a conical taper angle, a longitudinal pin axis, and a torque shoulder formed on an outer diameter of the pin member;
a tapered metal nose sealing surface on an exterior surface of the nose;
a tubular box member having internal threads and a mating surface formed on a rim of the box member that mates with the torque shoulder and an internal sealing surface that mates with the nose sealing surface; and
a tapered guide surface between the external threads and the nose sealing surface for preventing contact of the nose sealing surface with the internal threads in the event of misalignment during stabbing, the guide surface having a larger outer diameter than the outer diameter of the nose sealing surface and being generally conical such that a line tangent to a taper angle of the guide surface passes radially outward of the nose sealing surface, the taper angle of the guide surface being larger than the taper angle of the external threads relative to the longitudinal axis.

14. A tubular connection comprising:
a tubular pin member that has an external thread, a pin stress relief groove above the external thread, a nose sealing surface on a nose of the pin, and a torque shoulder above-the upper metal sealing surface; and
a tubular box member that has a cooperative internal thread, a torque surface that mates with the torque shoulder of the pin, a first box stress relief grooves below the internal thread, a second box stress relief groove below the first stress relief groove, and a lower metal sealing surface below the second box stress relief groove that sealingly mates with the nose sealing surface, the first and second box stress relief grooves being separated by a guide band for contact by the pin member in the event of misalignment during stabbing.

15. The tubular connection of claim 14, wherein the guide band is conical.

16. The tubular connection of claim 14, wherein the first box stress relief groove has a lesser depth and lesser axial extent than the second box stress relief groove.

17. The tubular connection of claim 14, wherein the guide band has a lesser axial extent than the second box stress relief groove.

* * * * *